(12) United States Patent
Kozakaya

(10) Patent No.: US 8,107,688 B2
(45) Date of Patent: Jan. 31, 2012

(54) GAZE DETECTION APPARATUS AND THE METHOD OF THE SAME

(75) Inventor: Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1035 days.

(21) Appl. No.: 12/019,027

(22) Filed: Jan. 24, 2008

(65) Prior Publication Data
US 2008/0192990 A1    Aug. 14, 2008

(30) Foreign Application Priority Data

Feb. 9, 2007    (JP) .................................. 2007-030670

(51) Int. Cl.
*G06K 9/00* (2006.01)
(52) U.S. Cl. ........................................ 382/117
(58) Field of Classification Search .................. None
See application file for complete search history.

(56) References Cited

U.S. PATENT DOCUMENTS

| 7,065,230 | B2 | 6/2006 | Yuasa et al. |
| 2002/0013683 | A1* | 1/2002 | Toyama et al. ................... 703/2 |
| 2003/0039378 | A1 | 2/2003 | Yuasa et al. |
| 2006/0115125 | A1 | 6/2006 | Yuasa et al. |
| 2006/0269143 | A1 | 11/2006 | Kozakaya |

FOREIGN PATENT DOCUMENTS

| JP | 2002-274265 | 9/2002 |
| JP | 2002-352228 | 12/2002 |
| JP | 2004-255074 | 9/2004 |
| JP | 2005-013752 | 1/2005 |
| JP | 2006-343859 | 12/2006 |
| JP | 2007-004767 | 1/2007 |

OTHER PUBLICATIONS

Japanese Office Action for Japanese Patent Application No. 2007-030670 dated Jun. 28, 2011.

* cited by examiner

*Primary Examiner* — Daniel Mariam
*Assistant Examiner* — Elisa Rice
(74) *Attorney, Agent, or Firm* — Turocy & Watson, LLP

(57) ABSTRACT

An image input unit, a feature point detection unit configured to extract at least four image feature points including a feature point of a pupil and which do not exist on an identical plane from an input image, a three-dimensional face model storage unit configured to store shape information of a three-dimensional face model and at least coordinates of reference feature points on the three-dimensional face model corresponding to the feature points extracted by the feature point detection unit, a converting unit configured to convert a coordinate of the feature point of the pupil onto surface of the three-dimensional face model on the basis of the correspondence between the extracted feature points and the reference feature points, and a gaze estimating unit configured to estimate the gaze direction from the converted coordinate of the pupil are provided.

15 Claims, 3 Drawing Sheets

GAZE DETECTION APPARATUS AND THE METHOD OF THE SAME

CROSS-REFERENCE TO RELATED APPLICATIONS

This application is based upon and claims the benefit of priority from the prior Japanese Patent Application No. 2007-30670, filed on Feb. 9, 2007; the entire contents of which are incorporated herein by reference.

TECHNICAL FIELD

The present invention relates to a gaze detection apparatus that estimates the gaze direction of a face on an image and a method of the same.

BACKGROUND OF THE INVENTION

Gaze detection of a person from an image is very effective since a gazing area of the subject person is estimated without causing a subject person to wear a specific apparatus. However, the gaze direction depends not only on the movement of the eyeballs, but also on the posture of the head of the subject person, and the image pattern near the iris changes variously not only by the posture of the head and the direction of the eyeballs, but also by the facial configuration of individuals, which is a difficult subject to solve.

In a gaze detection method disclosed in Japanese Application Kokai 2005-13752, the shape of the iris of the subject person is approximated into an ellipse, and the gaze direction is detected on the basis of the parameter of the ellipse. However, since the change in appearance of the iris due to the posture of the head and the change in appearance of the iris due to the actual movement of the eyeballs cannot be discriminated, the gaze direction cannot be detected according to a given posture of the head.

In a gaze detection method disclosed in Japanese Patent No. 3790680, pattern dictionaries by the direction of pupils are prepared in advance, and the gaze direction is detected by matching between the dictionaries and the pupil patterns of an input image. However, in order to detect the gaze direction with high degree of accuracy, it is necessary to learn various gaze direction patterns in advance.

In a gaze detection method disclosed in Japanese Application Kokai 2004-255074, the shape of the eyeball is estimated from an image taken by a stereo camera, then, a contact plane with respect to the eyeball at the center of the iris is estimated, and then the normal line of the contact plane is detected as the gaze. However, this method has a problem that calibration of the stereo camera is necessary, and hence a large scale of system is required.

As described above, the related art has a problem that the gaze cannot be detected from a given posture of the head with a single-lens camera unless calibration or learning of the pattern by directions of the pupils is performed in advance.

In order to solve the problems in the related art as described above, it is an object of the invention to provide a gaze detection apparatus for estimating the gaze direction from a given posture of the head with a single-lens camera without necessity of calibration and learning of the pattern by directions of the pupils in advance, and a method of the same.

BRIEF SUMMARY OF THE INVENTION

According to embodiments of the invention, there is provided a gaze detection apparatus including: a feature point detection unit configured to extract at least four image feature points which do not exist on an identical plane from a face in an input image, the image feature points including a feature point of a pupil; a three-dimensional face model storage unit configured to store shape information of at least one three-dimensional face model, coordinates of reference feature points corresponding respectively to the image feature points on the three-dimensional face model, and a three-dimensional eyeball model relating to eyeballs on the three-dimensional face model; a converting unit configured to convert a coordinate of the feature point of the pupil onto surface of the three-dimensional face model on the basis of the correspondence between the image feature points and the reference feature points; and a gaze estimating unit configured to estimate the three-dimensional gaze direction on the basis of the three-dimensional eyeball model and the converted coordinate of the pupil.

DETAILED DESCRIPTION OF THE INVENTION

Figure 1:
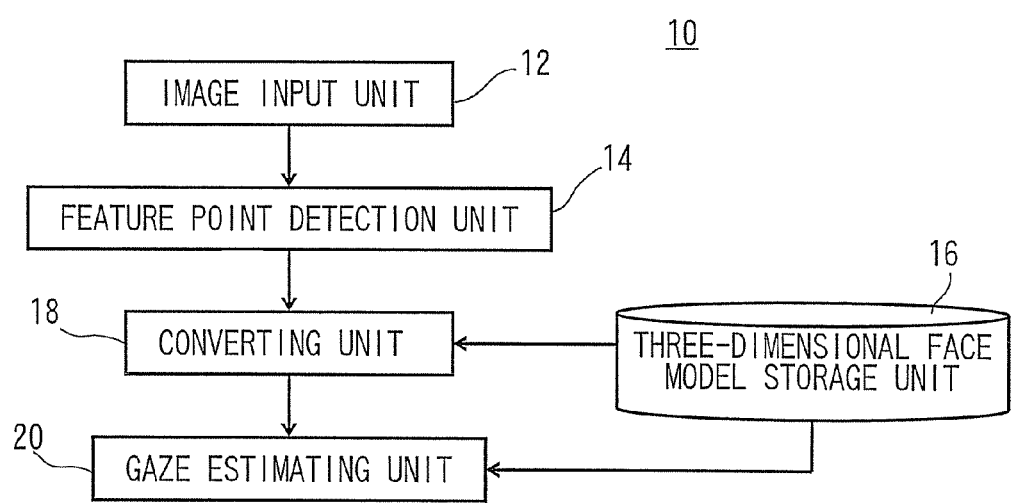
FIG. 1 is a block diagram showing a configuration of a gaze detection apparatus according to a first embodiment of the invention.

Referring now to the drawings, a gaze detection apparatus 10 according to embodiments of the invention will be described.

First Embodiment

Figure 2:
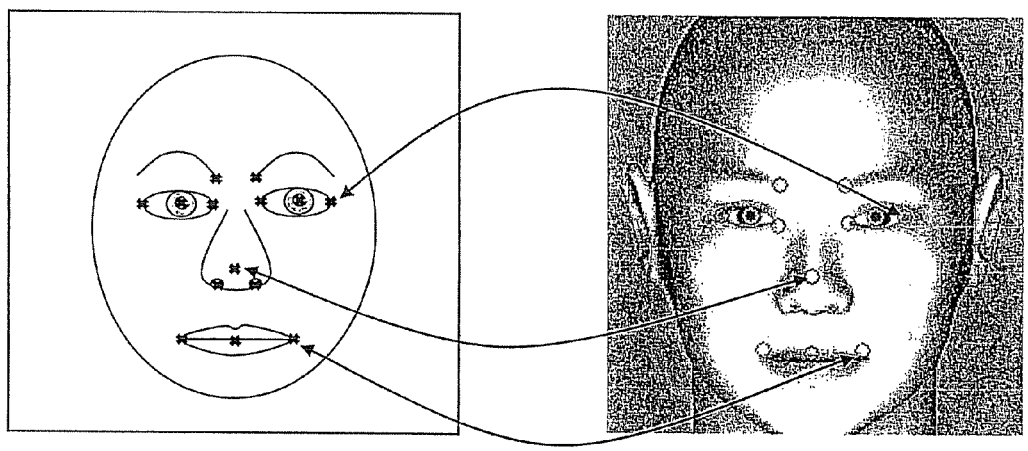
FIG. 2 is a drawing showing a relation between extracted feature points and reference feature points.
Figure 3:
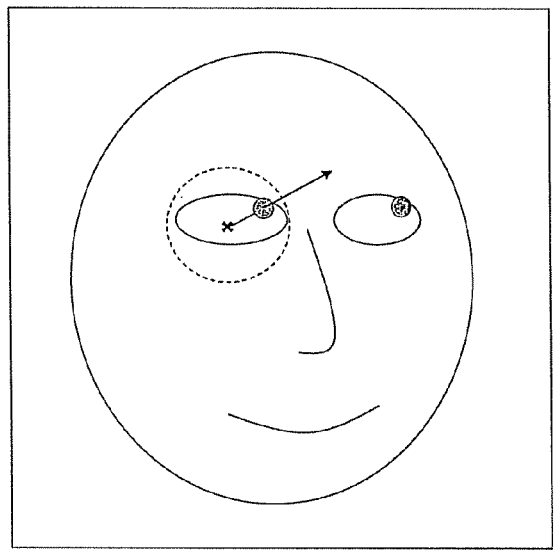
FIG. 3 is a conceptual drawing relating to the calculation of the vector of the gaze.

Referring now to FIG. 1 to FIG. 3, the gaze detection apparatus 10 according to the first embodiment of the invention will be described.

(1) Configuration of Gaze Detection Apparatus 10

FIG. 1 shows a configuration of the gaze detection apparatus 10 according to the first embodiment.

As shown in FIG. 1, the gaze detection apparatus 10 includes an image input unit 12 for entering the face of a subject person, a feature point detection unit 14 for extracting feature points including pupils from an input image, a three-dimensional face model storage unit 16 for storing a three-dimensional face model and a three-dimensional eyeball model, a converting unit 18 for calculating correspondences between the extracted feature points and the feature points on the three-dimensional face model and converting the coordinates of the pupils on the image onto the three-dimensional face model and a gaze estimating unit 20 for estimating the gaze direction from the pupil points on the converted three-dimensional face model and the three-dimensional eyeball model.

(2) Operation of Gaze Detection Apparatus 10

Referring now to FIG. 1, the operation of the gaze detection apparatus 10 will be described.

(2-1) Image Input Unit 12

The image input unit 12 enters one face image including the pupils to be processed. The one image obtained from the image input unit 12 is sent to the feature point detection unit 14 in sequence.

The image input unit 12 includes a device as a component such as a USB camera or a digital camera. The component may also be a recording device, a video tape, a DVD or the like having face image data picked up and stored in advance, and may be a scanner that scans the face image. It is also possible to input an image via a network.

(2-2) Feature Point Detection Unit 14

The feature point detection unit 14 detects the coordinate of a face portion in the image including the pupils. Detection of the feature points may be done by any methods.

For example, the feature points may be detected through a method described in a literature "Facial Feature Point Extraction Method Based on Combination of Shape Extraction and Pattern Matching" Fukui, Yamaguchi, Singakuron (D-II) vol. J80-D-II, No. 9, p. 2170-2177, 1997.

The feature points to be detected may be of any combination as long as there are four or more including the pupils, and are not on an identical plane. For example, they may be the pupils, the corners of the mouth, and the tip of the nose. It is not necessarily required to detect both pupils. When one of the pupils is detected, the gaze direction of the detected pupil is estimated. Therefore, the first embodiment is applicable to a state in which one of the pupils is hidden like in the case in which the side face is entered.

(2-3) Three-Dimensional Face model Storage Unit 16

In the three-dimensional face model storage unit 16, the three-dimensional face model and the three-dimensional eyeball model as three-dimensional spatial information of the face are stored.

The three-dimensional face model may be formed of polygon meshes used in computer graphics, or of a depth map indicating depth information of the surface of the face.

The three-dimensional face model has coordinates including kinds of the feature points to be extracted by the feature point detection unit 14, that is, the coordinates of the reference feature points stored therein. For example, when the feature point detection unit 14 detects the pupils, the corners of the mouth and the tip of the nose, at least the pupils, the corners of the mouth, and the tip of the nose are also included in the reference feature points.

FIG. 2 shows a relation between the extracted feature points and the reference feature points. The left side of FIG. 2 shows an input face image on which the feature points are indicated by cross signs. The right side of FIG. 2 shows the three-dimensional face model, on which the reference feature points are indicated by circle signs. As shown in FIG. 2, the reference feature points corresponding to the feature points detected from the image are certainly defined, and are coordinated with respect to the respective feature points on a one-by-one basis. The variety of the extracted feature points and the variety of the reference feature points do not necessarily have to be matched.

The three-dimensional eyeball model includes the center coordinate of the eyeballs, the positions of the pupils on the full-face model (they may be the same as the coordinates of the reference feature points of the pupils or may be defined separately), and the radius of the pupil. The three-dimensional eyeball model may be an ellipse including information of the long axis and the short axis thereof.

It is also possible to save memory by storing information only on the coordinates of the reference feature points or the center coordinates of the eyeballs required for the three-dimensional face model in contrast to a stereo method which requires high-density three-dimensional model information.

The three-dimensional information of the face may be an average model generated from the shapes of the faces of a plurality of persons or a general model which represents a general face. Alternatively, when face models for individuals are obtained, an advanced degree of accuracy is achieved thereby.

(2-4) Converting Unit 18

The converting unit 18 calculates the correspondences between the input face and the three-dimensional face model according to the extracted feature points and the reference feature points on the three-dimensional face model, and converts the coordinates of the pupils on the image onto the face model.

A projection matrix M representing the correspondence with respect to the input face is defined by a formula (1), a formula (2) and a formula (3) using a feature point $(x_i, y_i)$ obtained by the feature point detection unit 14 and a reference feature point $(x_i', y_i', z_i')$ on the corresponding three-dimensional shape.

$$W = [x_i - \bar{x}, y_i - \bar{y}]^T \quad (1)$$

$$S = [x_i' - \bar{x}', y_i' - \bar{y}', z_i' - \bar{z}']^T \quad (2)$$

$$W = MS \quad (3)$$

where $(\bar{x}, \bar{y})$ represents the center of gravity of the feature point on the input image, and $(\bar{x}', \bar{y}', \bar{z}')$ represents the center of gravity of the reference feature point.

As regards the formula (3), the projection matrix M is calculated by calculating a generalized inverse matrix $S^\dagger$ of S, and the projection matrix $M^\dagger$ is calculated by calculating the generalized inverse matrix $W^\dagger$ of W (formula (4) and formula (5))

$$M = WS^\dagger \quad (4)$$

$$M^\dagger = SW^\dagger \quad (5)$$

A method of obtaining the projection matrix M is not limited to the method shown above. For example, in the method shown above, the projection matrix M is calculated using a parallel projection model for simplification. However, the posture estimation with a higher degree of accuracy is achieved by defining the feature points on the basis of a perspective projection model which is closer to the real world.

The description shown below is focused on the projection matrix M. However, any methods may be employed as long as the three-dimensional face model is coordinated with the input face. For example, when a table which shows coordination between the three-dimensional face model and the input face is obtained, a method described below is applied easily.

Subsequently, the coordinates of the pupils are converted onto the face model by using the projection matrix M. The coordinate (x, y, z) of the pupil on the three-dimensional face model and the corresponding coordinate (X, Y) of the pupil on the image are expressed by a formula (6) shown below with the projection matrix M. Strictly, the equal sign is not correct because the face model is different from the shape of the actual face and there exists an error due to the parallel projection. However, the error is considered to be negligible in this case.

$$\begin{bmatrix} X - \bar{x} \\ Y - \bar{y} \end{bmatrix} = M \begin{bmatrix} x - \bar{x}' \\ y - \bar{y}' \\ z - \bar{z}' \end{bmatrix} \quad (6)$$

Furthermore, since the coordinate (x, y, z) of the pupil on the face model must exist on the three-dimensional eyeball model, the following formula (7) is satisfied, $$(x-a)^2 + (y-b)^2 + (z-c)^2 = r^2 \quad (7)$$

where (a, b, c) represents the center of the three-dimensional eyeball model, and r represents the radius thereof.

The coordinate (x, y, z) of the pupil on the face model is obtained by solving the formulas (6) and (7).

(2-5) Gaze Estimating Unit 20

The gaze estimating unit 20 calculates the gaze direction on the basis of the coordinate (x, y, z) of the pupil on the face model obtained by the converting unit 18.

The gaze direction in the three-dimensional space with reference to the three-dimensional face model is expressed as a vector (x−a, y−b, z−c) from the center of the eyeball (a, b, c) to the coordinate (x, y, z) of the pupil. The vector of the gaze corresponds to the gaze direction of the three-dimensional face model.

FIG. 3 is a conceptual drawing relating to the calculation of the vector of the gaze. The face in FIG. 3 is the three-dimensional face model and a sphere drawn in a dot line is the three-dimensional eyeball model. A cross-sign indicates the center of the eyeball, and circle signs are converted points of pupils. The gaze direction is a vector indicated by an arrow which connects the center of the eyeball and point of pupil. Although these marks are only illustrated on the right eye in the drawing, they are completely the same also for the left eye.

At this time, when the three-dimensional face model is defined in a state of full-face, the gaze direction in the case of the full-face is determined irrespective of the posture of the input face.

However, when determining the gaze direction on the image (real world), it is necessary to obtain a rotation matrix R between the input face and the three-dimensional face model from the projection matrix M, and convert the vector of the gaze into the vector of the gaze on the image by the rotation matrix R. The rotation matrix R is obtained, for example, by the following method.

(2-5-1) First Method

A first method will be described. The projection matrix M may actually be regarded as a motion matrix which represents the motion of coordinate axis of the camera assuming that the input face is fixed and the direction of the camera is changed. In other words, transposed vectors that the respective row vectors of the projection matrix M are normalized into Norm 1 are equal to two base vectors i, j from among three base vectors of the coordinate of the camera and a remaining base vector k is obtained from the vector product of i and j. The matrix including these base vectors corresponds to the rotation matrix R.

(2-5-2) Second Method

The rotation matrix R is obtained also by a second method. The projection matrix M obtained by solving the formula (4) may be deformed not only by deformation by rotation and enlargement, but also by three-dimensional affine transformation. Therefore, the base vectors i, j may not intersect orthogonally with each other (may not satisfy a property as the rotation matrix). In such a case, the projection matrix M which has only rotational and scaling components may be obtained by considering a constraint such that the row vectors of the projection matrix M intersect orthogonally with each other while satisfying the formula (3) as much as possible. The rotation matrix R is obtained by the method shown above from the base vectors of the obtained projection matrix M. Accordingly, the rotation matrix R with higher degree of accuracy is obtained.

(3) Advantages

As described thus far, according to the gaze detection apparatus 10 in the first embodiment, the gaze may be estimated only from one image of the arbitrary posture of the head taken by the single-lens camera using the plurality of feature points including the pupils, the three-dimensional face model and the three-dimensional eyeball model without performing calibration in advance.

Second Embodiment

Figure 4:
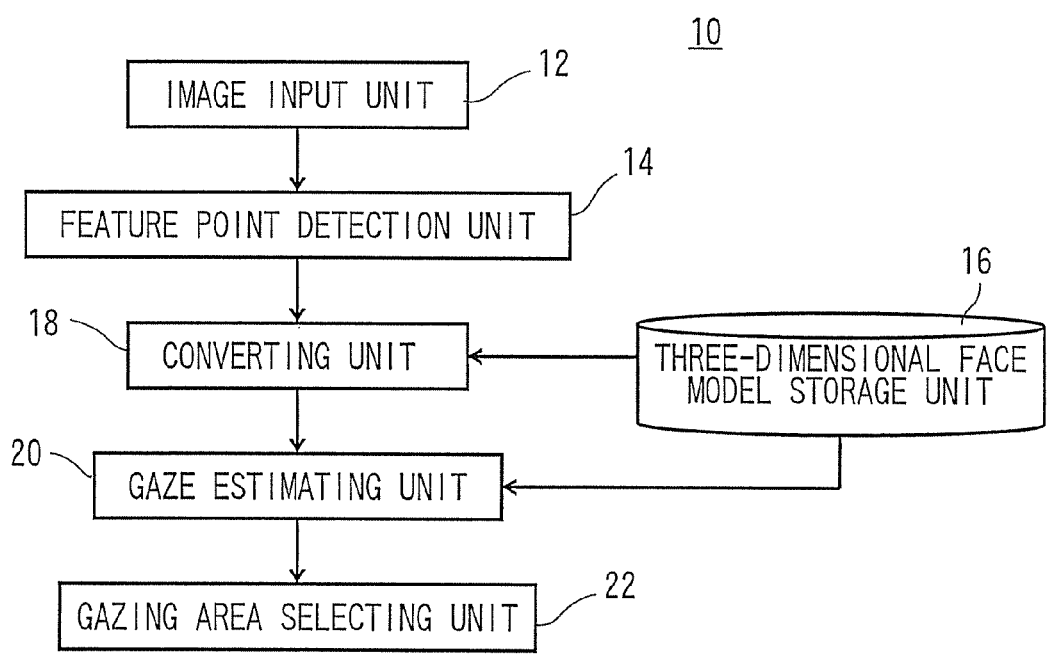
FIG. 4 is a block diagram showing a configuration of the gaze detection apparatus according to a second embodiment of the invention.
Figure 5:
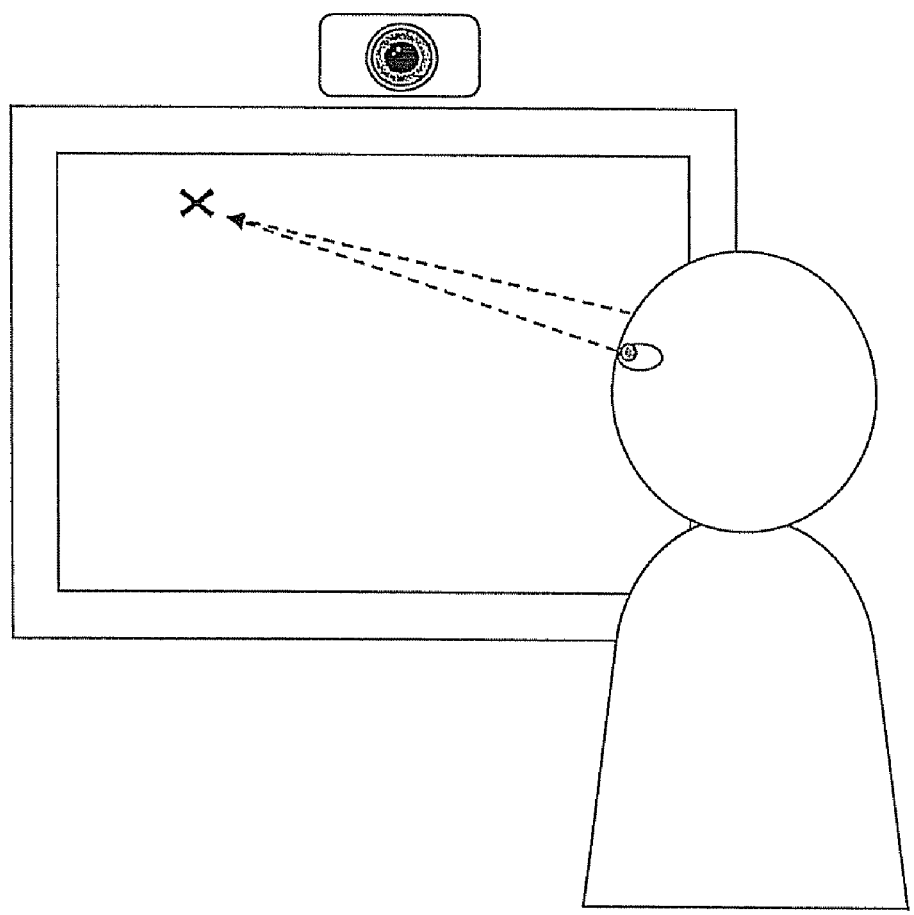
FIG. 5 is a drawing showing how to select candidates of gazing points from the gaze direction.

Referring now to FIG. 4 and FIG. 5, the gaze detection apparatus 10 according to a second embodiment will be described.

(1) Configuration of Gaze Detection Apparatus 10

FIG. 4 is a configuration of the gaze detection apparatus 10 according to the second embodiment.

As shown in FIG. 4, the gaze detection apparatus 10 includes the image input unit 12 that enters the face of the subject person, the feature point detection unit 14 that extracts feature points including pupils from the input image, the three-dimensional face model storage unit 16 that stores the three-dimensional face model and the three-dimensional eyeball model, the converting unit 18 that calculates correspondences between the extracted feature point and the feature point on the three-dimensional face model and converts the coordinates of the pupils on the image onto the three-dimensional face model, the gaze estimating unit 20 that estimates the gaze direction from the pupil points on the converted three-dimensional face model and the three-dimensional eyeball model, and a gazing area selecting unit 22 that selects an area that a user is gazing from the obtained gaze direction.

The image input unit 12, the feature point detection unit 14, the converting unit 18 and the gaze estimating unit 20 are the same as those described in the first embodiment, and hence description will be omitted.

(2) Operation of Gaze Detection Apparatus 10

Referring now to FIG. 4, the operation of the gaze detection apparatus 10 will be described.

The gazing area selecting unit 22 selects the area that the user is gazing from the gaze direction obtained by the gaze estimating unit 20 from among predetermined candidates.

FIG. 5 is a conceptual drawing showing the gazing area selection.

It is assumed that the user stands in front of the camera and gazes at a point indicated by a cross sign as shown in FIG. 5. Since the gaze direction taking the posture of the head of the user into consideration is obtained by the gaze estimating unit 20, the obtained gaze direction is used as the gaze direction with respect to the camera.

When the position or the angle of view of the camera is known in advance, the standing position in the three-dimensional space can be estimated from the position of the user in the image.

Although the position in the depth direction cannot be determined completely only with the single-lens camera, it is possible to estimate the depth information, for example, by utilizing the size of the head or the pupil.

Since the position of the head and the gaze direction of the user are calculated from these estimated positions, the direction that the user is gazing with respect to the camera in the actual three-dimensional space can be calculated. Through definition of candidate gazing areas with respect to the camera in the three-dimensional space in advance and calculation of the overlapped degree or the distance between the vector of the gaze and the candidate gazing areas of the user in the three-dimensional space, the most suitable gazing area can be selected.

When the suitable candidate gazing area does not exist with respect to the obtained gaze direction, it is also possible to output that the user is looking at an area other than the predetermined candidate gazing area.

The candidate gazing area may be defined to any things. For example, it is conceivable that the candidate gazing area is set to operating buttons or icons when it is applied to an interface of personal computers, and is set to commodities arranged on a shelf when it is applied to analysis of behavior of consumers in the field of marketing.

When the vectors of the gazes for the both pupils are obtained, the gazing area may be selected using an average of the two vectors of the gazes. Alternatively, it is also possible to select the gazing area with a higher degree of accuracy by obtaining an angle of convergence of the two eyes, for example, from the two vectors of the gazes and, when the angle of convergence is too large, rejecting it as an erroneous detection of the gaze.

It is further possible to estimate the gazing area that the user is focusing on by obtaining an intersection of the two vectors of the gazes in the three-dimensional space (or the closest point between the two straight lines) and determining this point as a gazing point in the three-dimensional space.

(Modification)

The invention is not directly limited to the embodiments shown above, and the components may be modified and embodied in the stage of implementation without departing the scope of the invention. Various modes of the invention may be achieved by combining the plurality of components disclosed in the embodiments shown above appropriately. For example, some components may be eliminated from all the plurality of components disclosed in the above described embodiments. In addition, the components from different embodiments may be combined as needed.

(1) Modification 1

Modification 1 will be described.

In the first embodiment, the coordinates of the pupils on the image are converted onto the coordinate on the three-dimensional face model by the converting unit 18.

However, it is also possible to convert the given feature points other than the pupils onto the three-dimensional face model and obtain errors with respect to the coordinates of the reference feature points corresponding thereto, so that the errors of coordination between the input face and the three-dimensional face model can be obtained and outputted as the reliability of the estimated gaze direction.

As regards conversion of the general feature points other than the pupils, since the restraint condition such as the formula (7) using the three-dimensional eyeball model does not exist, a condition such that the depth (z-coordinate) after conversion remains unchanged with respect to the corresponding coordinates of the reference feature points is further added.

The errors between the coordinates converted onto the three-dimensional face model and the corresponding coordinates of the reference feature points are considered to represent adequacy of coordination by the projection matrix M between the input face and the three-dimensional face model. Assuming that the input face and the three-dimensional face model are significantly different, that is, when the arrangement of the input feature points in the real world and the arrangement of the feature points of the three-dimensional face model are significantly deviated from the three-dimensional analogous relation, a large error is generated in feature points after conversion with any projection matrix M. When the difference between the arrangement of the feature points in the real world and those of the three-dimensional face model is significant in this manner, the gaze direction estimated thereby may have a large margin of error.

Therefore, by employing the error of feature points after conversion as well as the estimated gaze direction as the degree of reliability for the coordination with respect to the three-dimensional face model, possibility of erroneous detection of the gaze direction can be reduced. The degree of reliability from the error of the feature points after conversion may be obtained from any values such as the sum of errors in the results of conversion of the plurality of feature points, the maximum value or the minimum value.

Alternatively, it is also possible to estimate the gaze direction using the three-dimensional face model by preparing a plurality of three-dimensional face models, and selecting the three-dimensional face model which has the highest reliability (has the smallest conversion error).

(2) Modification 2

Modification 2 will be described.

In the first embodiment, it is possible to restrain the error due to the non-rigid deformation of the face by excluding the coordinates of the pupils when calculating the projection matrix M by the converting unit 18. Since the movement of the coordinates of the pupils due to the movement of the eyeballs is the non-rigid deformation which cannot be expressed by the three-dimensional face model and the projection matrix M, it appears as noise when obtaining the projection matrix M. Therefore, the noise may be restraining by excluding the coordinates of the pupils when calculating a matrix S and a matrix W with the formulas (1) and (2).

When the gaze direction obtained as a result is oriented toward the front, that is, when the coordinates of the pupils after conversion and the corresponding coordinates of the reference feature points are sufficiently close to each other, the projection matrix M is calculated including the pupils again, so that the numerical stability can be improved.

It is also possible to exclude not only the pupil, but also the feature points which seem to move non-rigidly (corners of the mouth, for example) when calculating the projection matrix M, or to calculate the projection matrix M after having converted the both corners of the mouth into the centers of gravity at the corners of the mouth which are more stable for the deformation instead of using the both corners of the mouth directly. The feature points which seem to move non-rigidly mean feature points which cannot be expressed or which may cause a significant error only by scaling or rotating the three-dimensional face model in calculating the correspondences.

Accordingly, the error due to the non-rigid deformation which cannot be expressed by the three-dimensional face model is restrained, and hence further stable estimation of the gaze direction is achieved.

(3) Modification 3

Modification 3 will be described.

In the first embodiment, the gaze direction is calculated by the straight line connecting the coordinate (x, y, z) of the pupil and the center of the eyeball (a, b, c) on the face model obtained by the converting unit 18 in the gaze estimating unit 20. However, other methods may be employed for estimating the gaze direction.

For example, since the normal vector at a arbitrary coordinate on a surface of the face model (the three-dimensional eyeball model) can be calculated easily from the three-dimensional shape, the normal vector at the coordinate (x, y, z) of the pupil can also be calculated. The direction of the normal vector at the coordinate of the pupil may be employed as the gaze direction. Alternatively, it is also possible to estimate the gaze direction at a high speed by calculating the normal vector on the face model in advance and storing the same in a table.

The gaze direction may also be estimated by the distance between the coordinate (x, y, z) of the pupil on the face model and the coordinates of the pupils in the state of looking straight forward. The larger the distance between the detected coordinates of the pupils and the coordinates of the pupils in the state of looking straight forward, the larger the angle of the gaze direction becomes. In contrast, the smaller the distance, the smaller the angle of the gaze direction becomes since it approaches the state of looking straight forward.

The gaze direction can also be obtained from the angle of the straight line connecting two points of the coordinate of pupils on the face model and the coordinate of the pupils in the state of looking straight forward. The three-dimensional gaze direction is obtained by combining the direction and the angle described above. With these methods of estimating the gaze direction, calculation is possible without using the center coordinate of the three-dimensional eyeball model. Therefore, it is possible to select the desirable method of estimating the gaze direction according to the amount of information of the face and three-dimensional eyeball models or the required processing speed, and to estimate the gaze direction with higher degree of accuracy by combining the results of estimation of the gaze direction obtained by the plurality of methods.

What is claimed is:

1. A gaze detection apparatus comprising:
   a feature point detection unit configured to extract at least four image feature points which do not exist on an identical plane from a face in one input image, the image feature points including a feature point of a pupil;
   a three-dimensional face model storage unit configured to store shape information of at least one three-dimensional face model, coordinates of reference feature points corresponding respectively to the image feature points on a three-dimensional face model of the at least one three-dimensional face model, and a three-dimensional eyeball model relating to eyeballs in the three-dimensional face model;
   a converting device configured to convert a coordinate of the feature point of the pupil onto a surface of the three-dimensional face model, based on a correspondence between the image feature points and the reference feature points, to yield a converted coordinate of the pupil; and
   a gaze estimating unit configured to estimate a three-dimensional gaze direction based on the three-dimensional eyeball model and the converted coordinate of the pupil.

2. The apparatus according to claim 1, wherein the three-dimensional eyeball model includes a center coordinate of one of the eyeballs in the three-dimensional face model, and the gaze estimating unit is configured to estimate the three-dimensional gaze direction based on the center coordinate and the converted coordinate of the pupil.

3. The apparatus according to claim 2, wherein the gaze estimating unit is configured to estimate the gaze direction from a straight line connecting the center coordinate and the converted coordinate of the pupil.

4. the apparatus according to claim 1, wherein the three-dimensional eyeball model includes coordinates of pupils of the three-dimensional face model in a state of looking straight forward, and the gaze estimating unit is configured to estimate the gaze direction based on the coordinates of the pupils in the state of looking straight forward and the converted coordinate of the pupil.

5. The apparatus according to claim 2, wherein the converting unit is configured to calculate a projection matrix between the image feature points and the reference feature points, and convert the coordinate of the feature point of the pupil on the input image onto the surface of the three-dimensional face model using the projection matrix.

6. The apparatus according to claim 1, further comprising a gazing area selecting unit configured to select a gazing area from candidate gazing areas predetermined in a three-dimensional space based on the three-dimensional gaze direction in advance.

7. The apparatus according to claim 1,
   wherein the three-dimensional face model storage unit is configured to store the shape information from a plurality of three-dimensional face models,
   wherein the converting unit is configured to evaluate reliability of correspondences between the face on the input image and the plurality of three-dimensional face models based on errors between converted image feature points and the reference feature points, and
   wherein the gaze estimating unit is configured to select a selected three-dimensional face model, from the plurality of three-dimensional face models, having a highest reliability, and to detect the gaze direction based on the selected three-dimensional face model.

8. The apparatus according to claim 1, wherein the converting unit is configured to calculate the correspondence based on the image feature points and reference feature points other than feature points of the pupils.

9. The apparatus according to claim 1, wherein the converting unit is configured to calculate the correspondence based on a center of gravity between the feature point of the pupil and the reference feature points corresponding to image feature points other than the pupil.

10. A method of detecting a gaze performed by a gaze detection apparatus, comprising:
    extracting at least four image feature points which do not exist on an identical plane from a face in one input image, the image feature points including a feature point of a pupil;
    storing shape information of at least one three-dimensional face model, coordinates of reference feature points corresponding respectively to the image feature points on a three-dimensional face model of the at least one three-dimensional model, and a three-dimensional eyeball model relating to eyeballs on the three-dimensional face model;
    converting a coordinate of the feature point of the pupil onto a surface of the three-dimensional face model, based on a correspondence between the image feature points and the reference feature points, to yield a converted coordinate of the pupil; and
    estimating a three-dimensional gaze direction based on the three-dimensional eyeball model and the converted coordinate of the pupil.

11. The method according to claim 10, wherein the three-dimensional eyeball model includes a center coordinate of one of the eyeballs in the three-dimensional face model, and the estimating includes estimating the three-dimensional gaze direction based on the center coordinate and the converted coordinate of the pupil.

12. The method according to claim 11, wherein the estimating the three-dimensional gaze direction includes estimating the three-dimensional gaze direction from a straight line connecting the center coordinate and the converted coordinate of the pupil.

13. The method according to claim 10, wherein the three-dimensional eyeball model includes coordinates of pupils of the three-dimensional face model in a state of looking straight forward, and the estimating includes estimating the three-dimensional gaze direction based on the coordinates of the pupils in the state of looking straight forward and the converted coordinate of the pupil.

14. The method according to claim 10, further comprising selecting a gazing area from candidate gazing areas predetermined in a three-dimensional space based on the three-dimensional gaze direction in advance.

15. A program stored in a non-transitory computer-readable medium, for causing a computer to execute functions comprising:
- extracting at least four image feature points which do not exist on an identical plane from a face in one input image, the image feature points including a feature point of pupil;
- storing shape information of at least one three-dimensional face model, coordinates of reference feature points corresponding respectively to the image feature points on the three-dimensional face model, and a three-dimensional eyeball model relating to eyeballs on the three-dimensional face model;
- converting a coordinate of the feature point of the pupil onto a surface of the three-dimensional face model, based on a correspondence between the image feature points and the reference feature points, to yield a converted coordinate of the pupil; and
- estimating a three-dimensional gaze direction based on the three-dimensional eyeball model and the converted coordinate of the pupil.

* * * * *